March 9, 1965  J. K. CALDWELL  3,172,550
PRODUCT HANDLING AND PLACEMENT MACHINE
Filed May 17, 1963  4 Sheets-Sheet 1

INVENTOR.
JAMES K. CALDWELL
BY
Mellin and Hanscom
ATTORNEYS

March 9, 1965 J. K. CALDWELL 3,172,550
PRODUCT HANDLING AND PLACEMENT MACHINE
Filed May 17, 1963 4 Sheets-Sheet 2

INVENTOR.
JAMES K. CALDWELL
BY
Mellin and Hanscom
ATTORNEYS

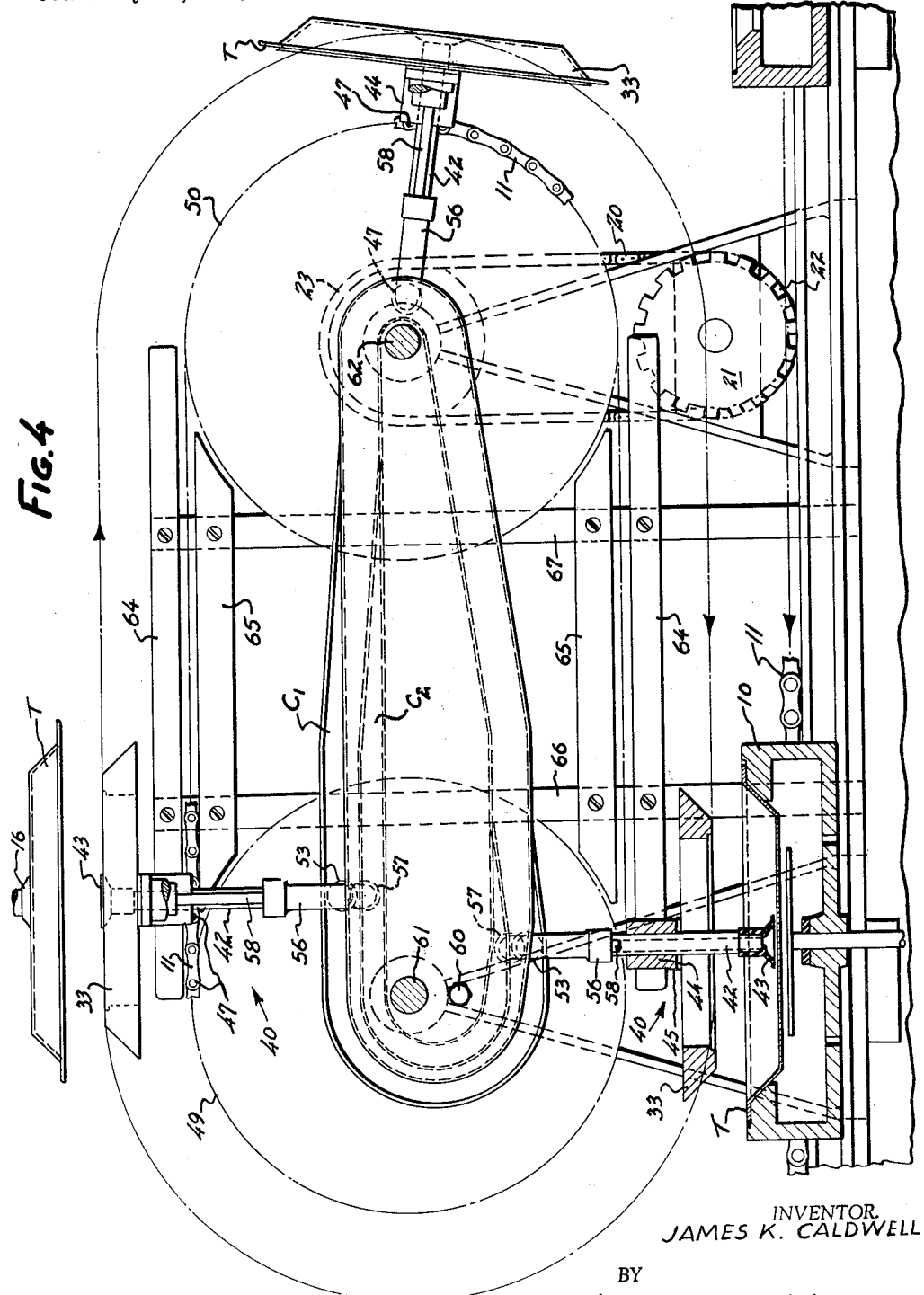

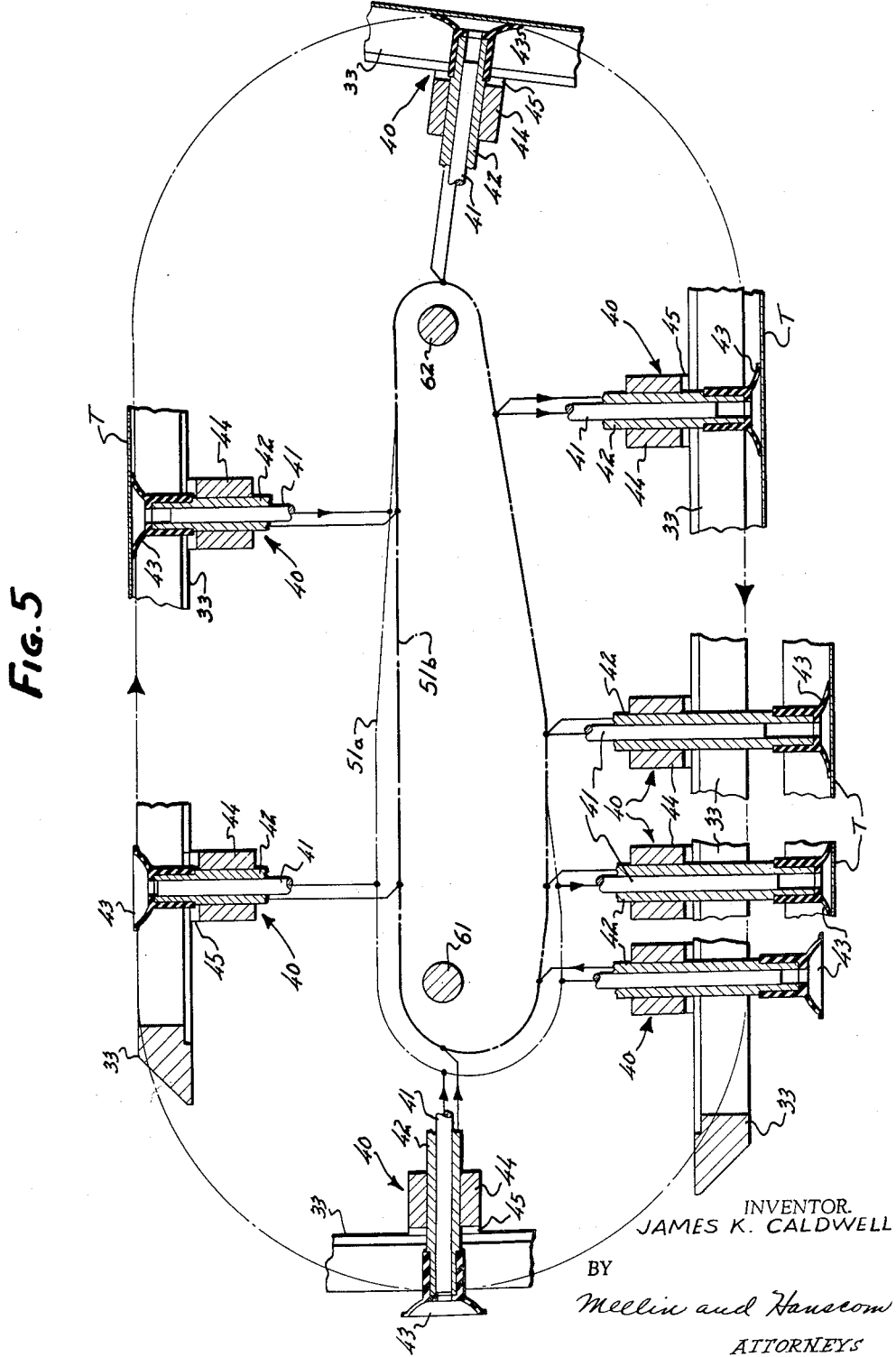

United States Patent Office 3,172,550
Patented Mar. 9, 1965

3,172,550
PRODUCT HANDLING AND PLACEMENT
MACHINE
James K. Caldwell, 15611 Risley St., Whittier, Calif.
Filed May 17, 1963, Ser. No. 281,095
10 Claims. (Cl. 214—8.5)

This invention relates to machinery and apparatus for handling and positioning objects in the course of production or manufacture. The invention, as described, particularly involves an improvement in machinery for positioning a pie tin within a moving die that forms an integral part of a straight-line pie machine.

Conventional pie making machines now utilize a set of "dropping wheels" for separating a pie tin from a stack of tins; and as each tin is separated from the stack it is allowed to fall into a moving pie forming die member. Because of the manner in which the "dropping wheels" effect a separation of one pie tin from a stack, it is necessary that the pie tins be of uniform construction. As a result, manufacturers of pie tins must maintain close tolerances in their product so that they can be properly dispensed through the "dropping wheels."

A further disadvantage of the "dropping wheel" construction is that it merely allows the pie tin to fall into the moving pie forming dies. Since the pie tins are relatively light in weight for their surface area, it is not uncommon for the tins to be moved laterally by air currents as they fall toward the moving die members. This results in a misalignment, which ordinarily requires manual correction. On the other hand, and even though the pie tins come to rest in their die members, it is necessary that each pie tin be "wiped" into its die members, since the weight of the tins alone is not sufficient to insure that they are positively mated and positioned in the die members.

In brief, the present invention comprises a novel system for separating a pie tin from a stack and then placing a separated pie tin with precision into the moving die member of a conventional pie machine. The apparatus provided especially contemplates a transfer mechanism comprising a suction means, including a piston reciprocally disposed in a cylinder, and a pair of continuous cam tracks for reciprocally moving said piston and cylinder, respectively, while the suction means is being moved generally along the pair of cam tracks. In addition, a support member or mandrel is provided unitarily with each suction means for receiving and positioning objects being transferred.

It is a primary object of the present invention to provide a machine which will positively position an object such as a pie tin relative to a moving container or receptacle such as a pie forming die.

Another object is to provide a machine of the kind described which does not require critical tolerances or extreme accuracy in the manufacture of a product for it to be properly handled and positioned relative to a moving die member.

Another object of the invention is to provide a machine of the kind described that may be used in connection with objects formed of various materials and objects of various sizes and shapes.

Other objects of this invention will become apparent in view of the following detailed description and the accompanying drawings.

In the drawings forming a part of this application and in which like parts are identified by like reference numerals throughout the same, FIG. 1 is a plan view including a schematic operating diagram of apparatus for placing a single pie tin within a moving pie forming die;

FIG. 4 is a vertical section taken on line 4—4 of FIG. 3; and

FIG. 5 is a diagrammatic view showing various positions occupied by the piston and cylinder of each suction means during one cycle of operation.

Figures 1, 2:
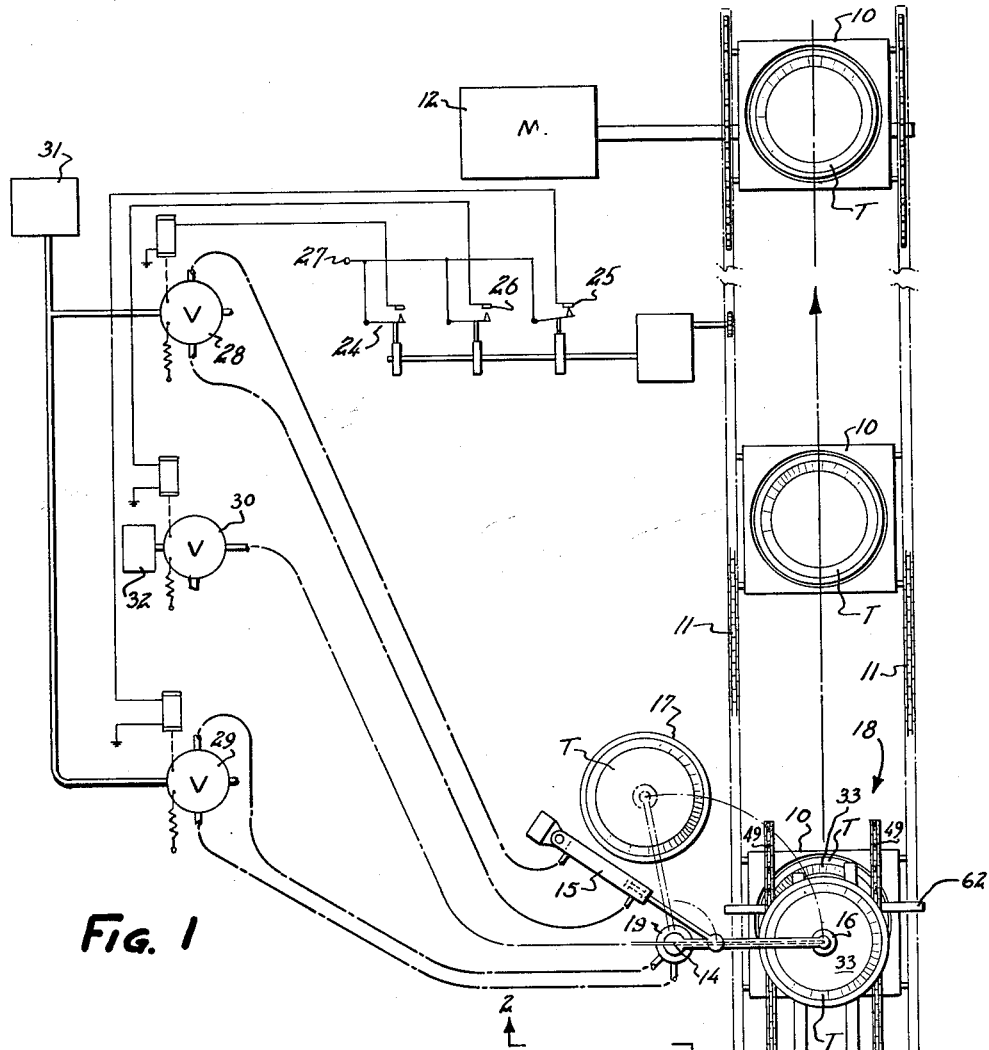
FIG. 2 is an elevation of apparatus shown in FIG. 1, taken on line 2—2 thereof.

Referring to FIGS. 1 and 2 in particular, there is illustrated a plurality of pie forming dies 10 mounted to a continuous chain conveyor 11 that is driven by a motor 12. A vacuum pick-up arm 13 pivoted upon a vertical axis 14 may be moved by a pneumatic cylinder 15 between positions which place a sucker 16 mounted on arm 13 either over a supply stack 17 of pie tins T or the center of a pie tin placement machine 18. In addition to being pivoted, arm 13 may be vertically lifted by a pneumatic cylinder 19 so as to separate the uppermost pie tin T of the stack 17 from the other pie tins.

Pie tin placement machine 18, which is described hereinafter in greater detail, receives each pie tin carried to it by the arm 13. The operation of machine 18 is synchronized with the movement of conveyor 11, being driven thereby as through a chain drive 20 and sprockets 21, 22 and 23. The operation of vacuum pick-up arm 13 is also synchronized with the movement of conveyor 11, and FIG. 1 of the drawing illustrates one operating circuit for the pick-up arm 13.

Referring to FIG. 1 in particular, motor 12 drives three timer switches 24, 25 and 26, each of which is connected to an electrical power source 27. When and as the respective switches 24, 25 and 26 are closed they energize solenoid operated control valves 28, 29 and 30 against a spring bias. Valves 28 and 29 are fluidly connected with an air supply 31 and transmit air pressure to pneumatic cylinders 15 and 19, respectively. Valve 30, when energized, connects a source of vacuum pressure 32 to arm 13.

Timer switches 24, 25 and 26 are programed in a cycle of operation such that arm 13 is moved downwardly until sucker 16 contacts the uppermost pie tin supported upon stack 17. A vacuum pressure is then applied to arm 13 after which the arm is raised and pivoted to a position overlying a movable support member 33 of pie tin placement machine 18. In the raised position of arm 13, sucker 16 is held at an elevation slightly above support member 33 but spaced therefrom at least as great a distance as the depth of a single pie tin. Once a pie tin has been separated from stack 17 and transferred to a position overlying the support member 33 of transfer mechanism 18, the vacuum pressure in arm 13 is interrupted, allowing the pie tin to fall upon and be positioned by the support member. Arm 13 is subsequently pivoted back over the stack 17 and the operation is repeated in timed sequence to the movement of support members 33 of machine 18.

Figure 3:
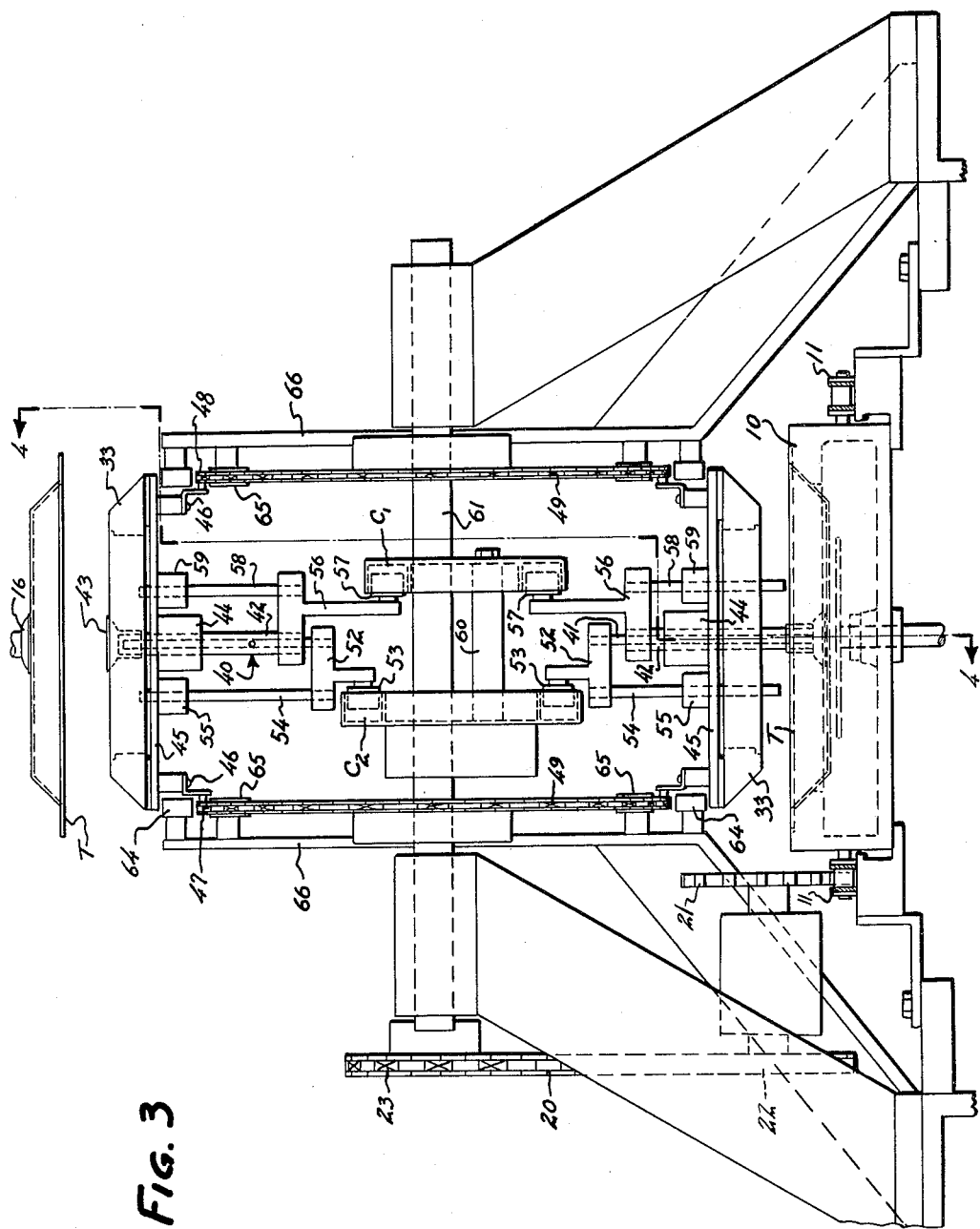
FIG. 3 is a detail and end elevation of the machine for placing a pie tin into a pie forming die.

Referring to FIGS. 3–5, pie tin placement machine 18 comprises three suction devices 40 mounted equidistant from each other upon a chain conveyor. Each suction device includes a piston 41 reciprocally disposed in a cylinder 42, and a sucker or vacuum cup 43 affixed to the open end of cylinders 42. Each cylinder 42 is reciprocally mounted in the boss 44 of a mounting plate 45 which is attached to a support member 33 by means of screws 46. The assembly of a support member 33 and a mounting plate 45 is attached by links to a pair of continuous chain belts 47 and 48, each belt being entrained around a pair of sprockets 49 and 50.

Means including a pair of elongate cam plates $C_1$ and $C_2$ is provided for reciprocating the cylinders 42 and the pistons 41, respectively, as the suction devices are moved by the chain belts 47 and 48. Cam plates $C_1$ and $C_2$ define first and second continuous cam tracks having control axes 51$a$ and 51$b$ disposed in parallel vertical planes intermediate the planes of chain belts 47 and 48.

Referring to FIGS. 3 and 4, the end of each piston 41 is adjustably attached to a roller support member 52 having a roller 53 disposed within the continuous cam track of cam plate $C_2$. Roller support 52 is also mounted to a guide pin 54 which is slidably mounted in a boss 55 of mounting plate 45. In like manner, cylinders 42 are attached to roller support members 56 which carry rollers 57. Each roller support 56 is also adjustably attached to a guide pin 58 slidably disposed in a boss 59 of support plate 55. Rollers 57 are received in the continuous cam track of cam plate $C_1$ to impart reciprocal movement to cylinders 42.

Cam plates $C_1$ and $C_2$ are held together in spaced relation by binder posts 60 and are supported upon shafts 61 and 62 from which pairs of sprockets 49 and 50, respectively, are rotatably supported.

It is to be noted that chains 47 and 48 are guided along upper and lower sections of travel by upper and lower pairs of rail members 64 and 65, each of said rails being mounted from a pair of vertical supports 66 and 67.

The operation of pie tin placement machine 18 is best understood and appreciated in view of FIG. 5, which illustrates various positions of operation for a suction means 40 as it is moved about cam plates $C_1$ and $C_2$.

At the point where each suction means 40 is moved beneath the sucker 16 on arm 13, the suction means and its supporting chains are guided along a rectilinear pathway by the upper guide rails 64 and 65. Pistons 41 and cylinders 42 are at that time positioned such that the sucker member 43 extends slightly above the upper surface of the associated support member 33. But immediately after a pie tin T is deposited upon the support member 33, a suction pressure is applied to the open end of sucker member 43 by reason of the axial movement of piston 31 relative to the cylinder 42. After a suction pressure has been applied, the suction means is inverted while it passes around sprockets 50. Both the piston 41 and cylinder 42 are then moved vertically downward as a unit while their rollers 53 and 57 follow a downwardly inclined portion of the control axes 51$a$ and 51$b$. During this movement, the pie tin T is lowered into a pie forming die 10 of a conventional pie machine. The distance with which each suction means is moved vertically is determined by the vertical displacement of axes 51$a$ and 51$b$ relative to chains 47 and 48, and such that there is a positive placement of the pie tins into the pie forming dies 10.

After a pie tin has been placed into a die 10, piston 41 is moved downward relative to cylinder 42, thereby breaking the vacuum. Cylinder 42 is then elevated relative to the piston in order to lift the sucker member away from the pie tin T while simultaneously producing an over-pressure in the sucker member, which insures that no vacuum pressure is retained. Thereafter, the suction means 40 is pivoted away from the die 10 as chains 47 and 48 to which it is mounted pass around sprockets 49.

Although the specific embodiment of machine 18 shown employs three suction means 40, it will be apparent that either a greater or fewer number of the sucker means might be employed, depending both upon the speed with which dies 10 are moved and the spacing between the dies. Furthermore, although a preferred embodiment of the invention has been described, it is to be understood that other changes may be made without departing from the spirit of the invention or the scope of the attached claims and each of such changes is contemplated.

What I claim and desire to secure by Letters Patent is:

1. In combination, means for separating a single object from a stack of like objects and releasing a separated object over a discharge point; suction means comprising a cylinder having an apertured end face and a piston reciprocally movable with respect thereto; means including a first cam track for reciprocally moving said cylinder; means including a second cam track for reciprocally moving said piston; and means for moving said suction means in a pathway extending generally along said first and second cam tracks, including a first position beneath said discharge point.

2. The combination of claim 1, and further including a support member movable with said suction means for receiving an object at said discharge point and positioning the object relative to and against said apertured end face of said cylinder.

3. In a machine of the kind described, a transfer mechanism comprising: suction means comprising a cylinder having an apertured end face and having a piston disposed for reciprocation interiorly of said cylinder, means including a first cam track for reciprocally moving said cylinder, means including a second cam track for reciprocally moving said piston, and means for moving said suction means relative to and along said first and second cam tracks to reciprocate said cylinder and piston, together and with respect to one another.

4. The transfer mechanism of claim 3 and further including a support member movable with said suction means for receiving and positioning an object relative to the open end of said cylinder.

5. The transfer mechanism of claim 3 wherein said means for moving said suction means comprises a pair of chain belts mounted in spaced parallel relationship to each other, and further comprising a pair of chain guides that define parallel rectilinear sections of travel for each chain belt, respectively.

6. The transfer mechanism of claim 3 wherein the control axes of said first and second cam tracks are located in parallel, vertical planes, said suction means being moved in a pathway vertically around said cam tracks.

7. The transfer mechanism of claim 6 wherein said means for moving said suction means comprises a pair of chain belts mounted for travel in spaced, parallel and vertical planes, the control axes of said first and second cam tracks being disposed in vertical planes intermediate the vertical planes of said pair of chain belts.

8. The transfer mechanism of claim 7 and further including a pair of chain guides that define horizontal and parallel rectilinear sections of travel for each chain belt, respectively.

9. The transfer mechanism of claim 7 wherein portions of said first and second cam tracks are inclined relative to the chain belts to impart movement to the cylinders and pistons relative to said chain belts, certain portions of said second cam track being inclined relative to said first cam track to move said piston relative to said cylinder.

10. A transfer mechanism for pie making machines, comprising: a pie tin supply; a conveyor carrying a series of spaced pie-forming dies, and a transfer mechanism including an endless array of suction devices movable between an inverted position adjacent said pie tin supply and an upright position adjacent said pie-forming dies while moving in synchronism therewith; said suction devices comprising a reciprocable hollow cylinder with an apertured resilient end face, and a piston reciprocably mounted in said cylinder to selectively subject said end face to a vacuum when said aperture is obstructed; pie tin centering means disposed circumferentially of said face and movable therewith; a pair of cam tracks associated respectively with said cylinder and piston for reciprocating the same as a function of their movement between said positions; and means for depositing inverted pie tins onto said suction devices in their inverted positions; said cam tracks being so arranged that suction begins a predetermined interval after deposit of said pie tins but prior to any reciprocating movement of said cylinder and ceases when said suction devices reach said upright position adjacent said pie-forming dies.

References Cited by the Examiner

UNITED STATES PATENTS

| 1,957,621 | 5/34 | Styron | 271—74 |
| 2,187,879 | 1/40 | Johnson. | |
| 2,586,281 | 2/52 | Wilson | 221—211 X |
| 2,611,493 | 9/52 | Nordquist. | |
| 3,033,604 | 5/62 | Ammon | 294—64 |

HUGO O. SCHULZ, *Primary Examiner.*

MORRIS TEMIN, *Examiner.*